(12) United States Patent
Moritz et al.

(10) Patent No.: US 8,195,387 B2
(45) Date of Patent: Jun. 5, 2012

(54) METHOD AND DEVICE FOR DRIVER ASSISTANCE

(75) Inventors: Rainer Moritz, Filderstadt (DE); Holger Leicht, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 11/988,610

(22) PCT Filed: May 29, 2006

(86) PCT No.: PCT/EP2006/062677
§ 371 (c)(1),
(2), (4) Date: Mar. 3, 2009

(87) PCT Pub. No.: WO2007/006606
PCT Pub. Date: Jan. 18, 2007

(65) Prior Publication Data
US 2009/0185718 A1 Jul. 23, 2009

(30) Foreign Application Priority Data
Jul. 14, 2005 (DE) .................... 10 2005 032 848

(51) Int. Cl.
*G06F 17/10* (2006.01)
(52) U.S. Cl. .................. 701/301; 382/104; 348/148
(58) Field of Classification Search .................. 701/301; 382/104; 348/148; 340/907
See application file for complete search history.

(56) References Cited

U.S. PATENT DOCUMENTS

| | | | | |
|---|---|---|---|---|
| 5,938,319 A * | 8/1999 | Hege | ............ | 362/459 |
| 5,939,987 A * | 8/1999 | Cram | ............ | 340/573.2 |
| 6,281,806 B1 * | 8/2001 | Smith et al. | .......... | 340/901 |
| 6,456,206 B1 * | 9/2002 | Rocca et al. | .......... | 340/975 |
| 6,577,334 B1 * | 6/2003 | Kawai et al. | .......... | 348/148 |
| 6,889,161 B2 * | 5/2005 | Winner et al. | .......... | 702/147 |
| 6,967,593 B2 * | 11/2005 | Carroll | ............ | 340/907 |
| 6,993,255 B2 * | 1/2006 | Braun et al. | .......... | 396/61 |
| 7,113,098 B1 * | 9/2006 | Hayes | ............ | 340/573.2 |
| 7,347,595 B2 * | 3/2008 | Brun et al. | .......... | 362/464 |
| 7,429,918 B2 * | 9/2008 | Watanabe | ............ | 340/468 |
| 7,526,103 B2 * | 4/2009 | Schofield et al. | .......... | 382/104 |
| 7,567,687 B2 * | 7/2009 | Kudo | ............ | 382/103 |
| 7,808,523 B2 * | 10/2010 | Nishida et al. | .......... | 348/148 |

(Continued)

FOREIGN PATENT DOCUMENTS

| | | |
|---|---|---|
| CN | 12157077 | 2/1994 |
| DE | 196 27 938 | 1/1998 |
| DE | 197 13 884 | 10/1998 |
| DE | 199 05 114 | 8/2000 |
| DE | WO 02/04247 | 1/2002 |
| DE | 100 53 315 | 5/2002 |
| DE | WO 03/106219 | 12/2003 |

OTHER PUBLICATIONS

Patent Abstracts of Japan, vol. 2000, No. 14, Mar. 5, 2001 & JP 2000 318513 (Mitsubishi Electric Corp.), Nov. 21, 2000.

*Primary Examiner* — Helal A Algahaim
(74) *Attorney, Agent, or Firm* — Kenyon & Kenyon LLP

(57) ABSTRACT

In a method and a device for driver assistance, traffic elements that point to potential danger zones are detected on the road, using a camera. If such potential danger zones are detected, at least one headlight of the vehicle is controlled in such a way that the potential danger zone is illuminated.

17 Claims, 3 Drawing Sheets

U.S. PATENT DOCUMENTS

| | | | |
|---|---|---|---|
| 2002/0135573 A1* | 9/2002 | Kanamori | 345/204 |
| 2004/0114921 A1* | 6/2004 | Braun et al. | 396/661 |
| 2004/0218401 A1* | 11/2004 | Okubo et al. | 362/526 |
| 2005/0073438 A1* | 4/2005 | Rodgers et al. | 340/944 |
| 2005/0093975 A1* | 5/2005 | Hamdan et al. | 348/118 |
| 2005/0180149 A1* | 8/2005 | Albou et al. | 362/459 |
| 2005/0232469 A1* | 10/2005 | Schofield et al. | 382/104 |
| 2005/0265596 A1* | 12/2005 | Lohmann | 382/153 |
| 2006/0206243 A1* | 9/2006 | Pawlicki et al. | 701/1 |
| 2006/0245199 A1* | 11/2006 | Brun et al. | 362/465 |

* cited by examiner

METHOD AND DEVICE FOR DRIVER ASSISTANCE

BACKGROUND OF THE INVENTION

1. Field of the Invention

The present invention relates to a method and a device for driver assistance.

2. Description of Related Art

The published German patent document 100 53 315 shows an example of a method and a device for driver assistance in which traffic signs are detected with the aid of a camera installed inside the vehicle. The traffic signs are extracted from the images recorded by the camera and compared to stored patterns. If a traffic sign is found, a measure that is appropriate for the traffic sign may be initiated if warranted, for instance a warning signal generated. Traffic signs that appear on the road lane, such as a zebra crossing or the like, are detected as well.

An example of the detection and modeling of road lane boundary markings from video images, is described in the published German patent document DE 196 27 938; in this case, lane width, lane curvature, change in curvature, and lateral offset of the vehicle, among others, are ascertained as parameters.

Of special importance in today's traffic is that the driver have a satisfactory view of the traffic situation. For this reason, work is currently conducted on systems for curve-dependent light control in which the alignment of the vehicle lights, which is fixed at present, is designed to be variable in order to provide improved illumination of the curve during cornering. The published German patent document DE 197 13 884 shows one such example.

A BRIEF SUMMARY OF THE INVENTION

Improved illumination of danger zones such as turn-off lanes, exits, pedestrian crossings etc., helps avoid accidents and improves traffic safety for pedestrians as well. Of special importance is that an understanding of whether a dangerous zone is at hand and, if so, what type of danger zone is involved, be based on video since this allows a reliable and precise recording of the actually existing traffic situation.

It is especially advantageous that even information with regard to the distance from the detected dangerous zone is able to be derived with the aid of the video-based detection, so that in one particularly advantageous exemplary embodiment the control of the vehicle lights varies as a function of the distance.

DETAILED DESCRIPTION OF THE INVENTION

Figure 1:
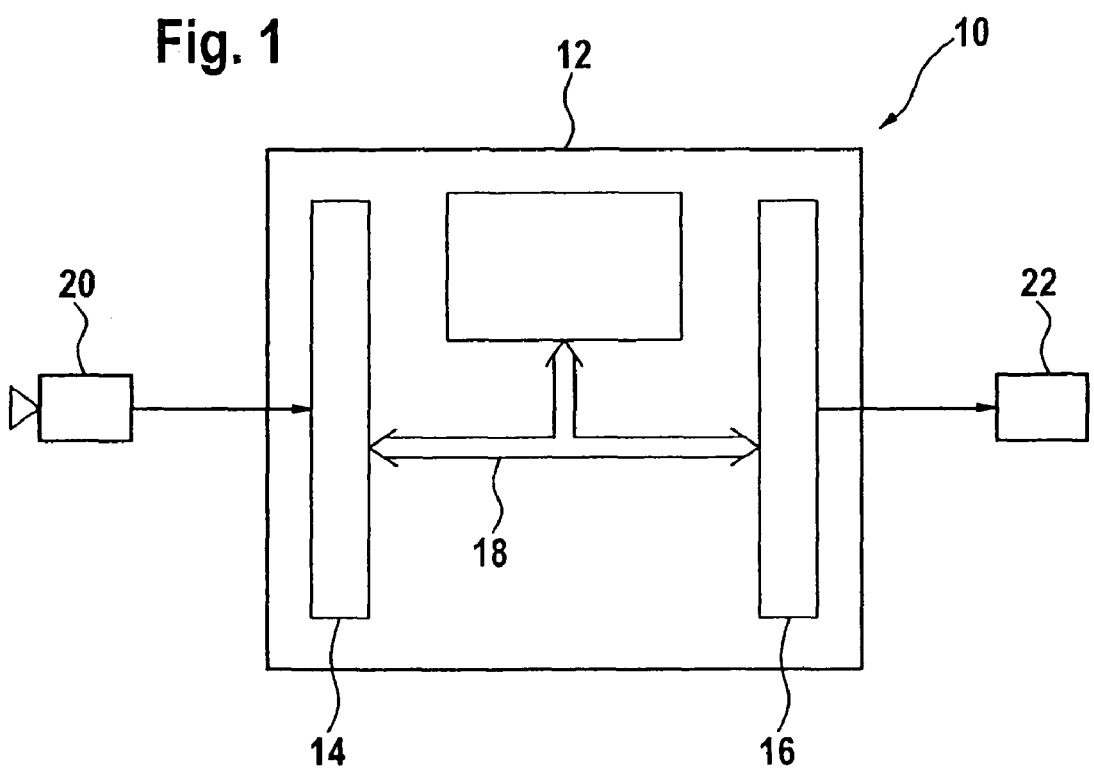
FIG. 1 shows a block diagram of a driver assistance system in which the method for driver assistance according to the present invention is realized, in particular for the purpose of illuminating danger zones.

FIG. 1 shows a driver assistance device 10, which essentially is made up of at least one processor 12, an input circuit 14, and an output circuit 16. These elements are connected to a bus system 18 for the mutual exchange of data and information. At least one camera 20 is provided in addition, which is positioned inside the vehicle so as to record the scene in front of the vehicle. The image area of camera 20 is selected such that information that appears on the road surface itself is likewise recorded by the images of the camera. In one first exemplary embodiment, corresponding image sequences are transmitted from camera 20 to driver assistance device 10 via an input line, e.g., a bus system. There, they are forwarded to microcomputer 12 for further processing. In another development, camera 20 is connected to an evaluation unit, which assumes the function of image analysis either completely or partially and which provides driver assistance device 10 only with result values or intermediate results of this image analysis function, possibly together with the image information.

The image sequences of camera 20 are analyzed by processor 12 or the evaluation unit (not shown) assigned to the camera for the purpose of determining the course of road lanes, in particular the course of lane boundary markings. This is typically done by isolating lane boundary markings with the aid of contrasts in the image, and, via transformation, describing their course as mathematical equation whose parameters constitute, for example, the radius of curvature of the lane boundary marking. Such algorithms are known from the related art mentioned in the introduction, for instance. Furthermore, it is known to record information that appears on the road surface itself, such as zebra crossings. In this case, a certain pattern is detected by analyzing the image sequence, the pattern being compared to a previously stored pattern; a match in the comparison leads to the conclusion that a zebra crossing was detected.

Using the information at hand, it is now possible to detect danger zones. In a first example embodiment, a detected zebra crossing is interpreted as danger zone. In a second example embodiment, an exit or a turn-off is detected as danger zone if, based on the lane boundary marking detection, for instance, it is detected that a line is branching off within the meaning of an additional lane, and/or if it is detected that the type of line changes from a solid to a broken line and the solid line branches off. In a third example embodiment, detected intersections are interpreted as danger zone, i.e., if two lane boundary markings are branching off, and/or if it is determined that the lane boundary markings are crossing traffic lanes. An existing danger zone is determined, e.g., in that the equations (curves) derived from the course of the markings are examined for intersections and angles between the curves. If one or a plurality of intersection(s) and/or characteristic angles is/are present, then the situations sketched above are able to be derived. The approaches shown above are employed singly or in any combination as a function of the configuration.

Depending on the development, the evaluation of the image sequences takes place in the processor of the driver assistance device. In another exemplary embodiment, in which an evaluation unit is assigned to the camera for image analysis, only the results of the image analysis are transmitted to the driver assistance device, for instance information in connection with a detected danger zone and the type of detected danger zone.

Furthermore, an estimation of the distance between the instantaneous position of the vehicle and the detected danger zone may be implemented. The danger zone is detected on the basis of a characteristic line constellation on the traffic lane; for example, a zebra crossing is detected by the wide parallel lines; an exit or turn-off is detected by the fact that one line is splitting into two lines, and/or an intersection by the fact that two lines are splitting into two individual lines in each case. The distance between this characteristic point that constitutes a danger zone and the instantaneous position of the vehicle is then estimated with the aid of a model, such as of a pinhole camera model, which transforms the world coordinates of the street into camera coordinates, and vice versa. Assuming that the detected markings lie in one plane, the distance between the vehicle and the danger zone is able to be estimated by the inverse transformation of the camera coordinates into world coordinates. In one exemplary embodiment, the evaluation unit analogously transmits a corresponding distance variable to driver assistance device 10.

If a danger zone has been detected, as shown above, processor 12 generates a control signal, which, via output circuit 16, it outputs to a final control element 22 for the adjustment of the vehicle lighting, in particular the headlights. In one specific embodiment the control signal is formed in such a way that each detected danger zone is allocated a particular control signal, which is assigned to a specific setting of the headlights within the meaning of improved illumination of the individual danger zone. The vehicle lighting, in particular the headlights, is then adjusted in accordance with the control signal.

In an exemplary embodiment, the control of the vehicle lights is implemented in such a manner that the illumination by at least one headlight of the vehicle is modified to the extent that, in addition to the street or road lane on which the vehicle is traveling, the detected danger zone is illuminated to a large degree. Furthermore, in one exemplary embodiment the light control is implemented as a function of driver inputs. For instance, a turn-off is illuminated only if it must be assumed, because of a driver input (such as activation of the turning signal), that the driver wishes to enter the turn-off lane.

In one example realization, the procedure sketched above is realized as a program of processor 12. One example of such a processor program is sketched in FIG. 2.

Figure 2:
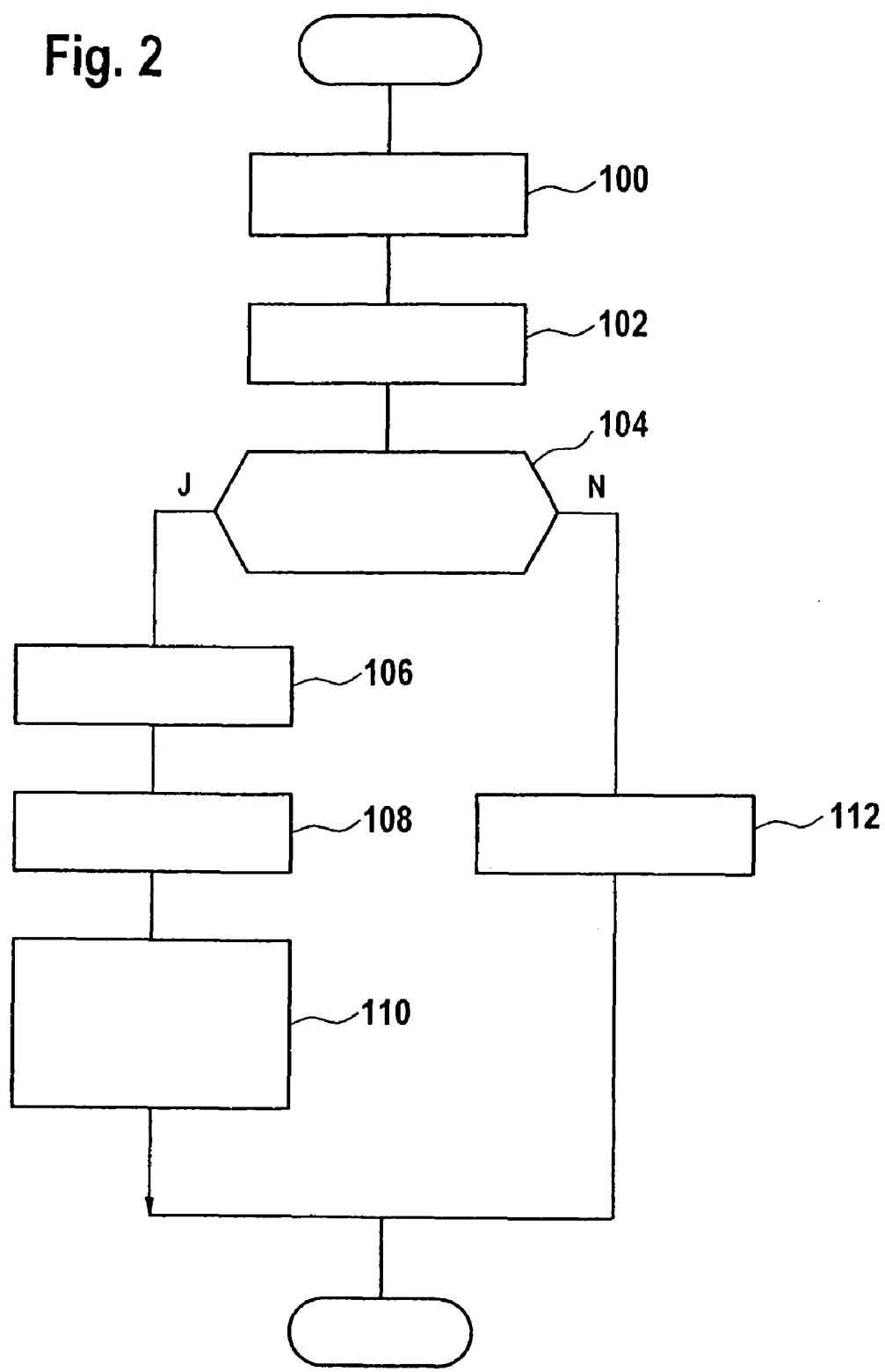
FIG. 2 shows a flow chart illustrating an example realization of the method for illuminating danger zones, e.g., in the form of a computer program.

The program sketched in FIG. 2 is initiated in response to the startup of the vehicle and/or a corresponding activation by the driver, and run through at predefined time intervals.

Figure 3:
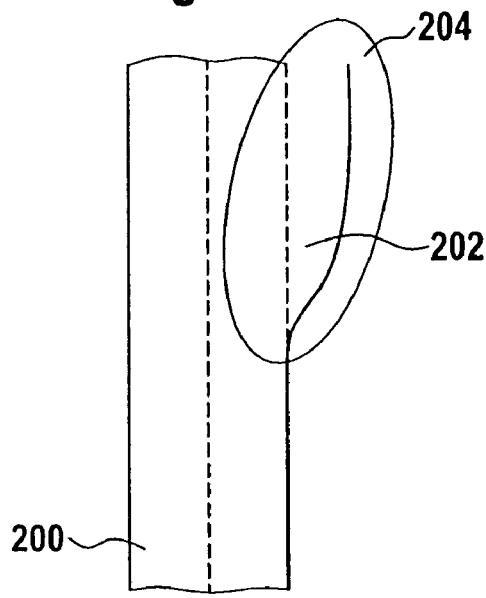
FIGS. 3 through 5 show drawings of traffic situations to elucidate the method of functioning of the driver assistance system.
Figure 4:
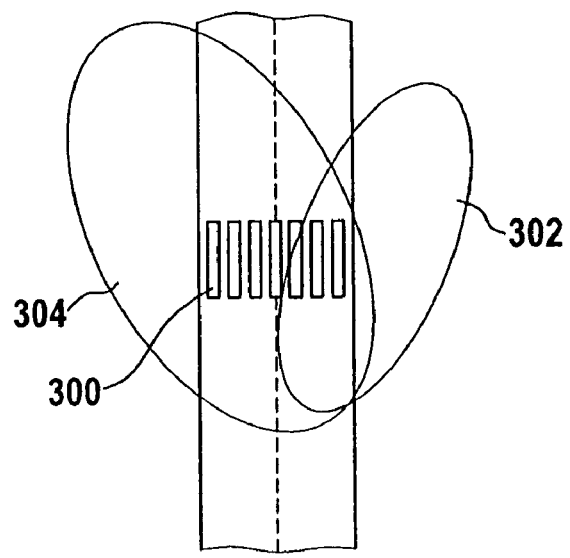
Figure 5:
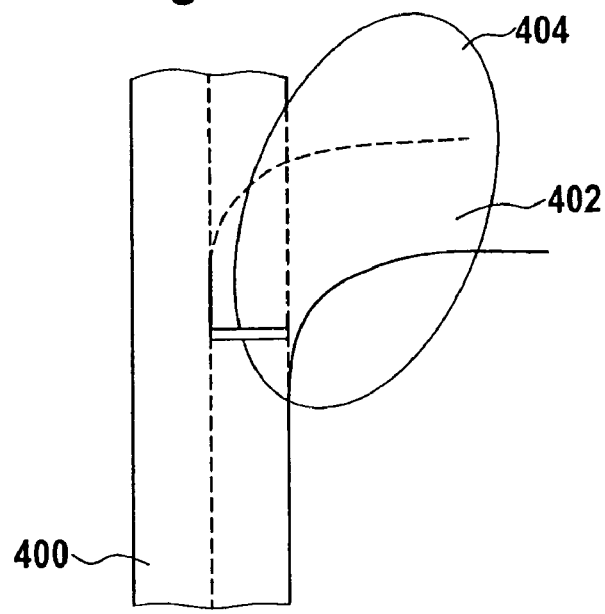

In step 100, at least one image recorded by the camera is first read in. According to the method illustrated above, an analysis of the image is then implemented in step 102 in order to determine whether predefined traffic elements representing danger zones are detectable in the image. Examples of such traffic elements are zebra crossings, which are detected on the basis of the broad parallel lines, and an exit or turn-off, which is detectable by a change in the line type from solid to broken, and by the branching off of the solid line, or else by the splitting of one line into two lines. A third traffic element is an intersection, which is detected based on the splitting of two roadway boundary markings and by the traffic lane being intersected by at least one of the roadway boundary markings. In the subsequent step 104, it is queried whether such a traffic element defining one of the predefined danger zones has been detected. If this is the case, the distance with respect to this traffic element, in particular with respect to at least one of its characteristic points, is read in a step 106. The distance value is estimated based on the image analysis, as indicated above. A driver intention, which, for example, consists of the activation of a turning signal, initiation of a braking operation, etc., is thereupon read in step 108. In step 110, a trigger signal for the light control of at least one headlight will then be output. The light control is a function of the type of danger zone and, depending on the exemplary embodiment, additionally also of the estimated distance of the danger zone relative to the vehicle, and/or the detected driver intention. In general, the control of at least one headlight of the vehicle is implemented in such a way that the detected danger zone is illuminated to a large degree. To this end, additional regions adjacent to the roadway areas already illuminated by the headlights are typically illuminated. In the most basic specific embodiment, a predefined setting of the light distribution of the headlights is controlled as a function of the type of danger zone (zebra crossing, exit or turn-off, intersection). Pertinent examples are shown in FIGS. 3 through 5. In another example embodiment, the distance to the danger zone is taken into consideration and the light control modified, within the meaning of a more complete illumination of the danger zone, as the distance to the danger zone decreases. In the case of exits or turn-offs, for instance, this means that only a relatively small additional area is illuminated initially, and the additionally illuminated area is enlarged as the turn-off is approached.

Furthermore, in one exemplary embodiment, the driver intention is taken into account, so that, if no driver intention is apparent, no light control takes place, so that the light control is implemented only if driver intent is present. One such example is the activation of the turning signal at exits or intersections, an illumination of the additional area, in particular the turn-off lane, taking place only if the driver has indicated a turn-off intention, e.g., by activating the turning signal of the vehicle. The initiation of a braking operation is another driver intention, which likewise represents the driver's intention to turn off or exit.

After the light control signal is output, the program is run through again by step 100.

If step 104 had the result that none of the predefined traffic elements representing predefined danger zones was detected, then the normal setting of the at least one headlight is maintained according to step 112. In other words, no control signal for illuminating additional areas will be generated.

However, if a danger zone has been detected in the preceding program run and a corresponding light control was implemented, this light control will be maintained for one or a few program runs once a traffic element has not been detected for the first time, thereby ensuring an illumination of the additional area even if the traffic element in question is no longer within the visual range of the camera. The light control is then returned to normal again. Following step 112, the program will be repeated at the next time interval by step 100.

Depending on the variant of the present invention, the aforementioned traffic elements are used singly or in any combination.

FIGS. 3 through 5 show examples of the light control illustrated above. Only the additional illuminations are shown in this context. In addition to these additional illuminations, the normal illumination of the road lane on which the vehicle is traveling is of course provided as well.

FIG. 3 shows the situation of an exit or turn-off. Shown is a two-lane road 200, which has an exit or turn-off lane 202. If this turn-off lane is detected based on the change in line type, from a solid to a broken line and branching-off of the solid line, for example, then the light control will be modified in such a way that an additional area 204 is illuminated.

FIG. 4 illustrates a corresponding method upon detection of a zebra crossing 300. It is detected on the basis of broad parallel lines, for example. In this case additional areas 302 and 304 are illuminated in order to also allow satisfactory detection of the edge regions of the zebra crossing.

FIG. 5 shows the situation of an intersection. Two-lane road 400 has a road 402 branching off. Analogously to the traffic situation shown in FIG. 3, this is detected by the splitting of boundary markings and/or on the basis of lines that run across the lane at an angle. In this case an additional area 402 is illuminated, which projects into the branching lane, thereby illuminating the region traveled by the driver during the turn-off operation.

What is claimed is:

1. A method for driver assistance in a vehicle, the method comprising:
    recording an image of an area in front of the vehicle with the aid of at least one camera;
    analyzing a traffic situation in front of the vehicle with the aid of the recorded image, wherein at least one traffic element that indicates a potential danger zone is determined by the analysis; and
    upon determination of a potential danger zone, controlling at least one illumination device of the vehicle so that illumination of the area in front of the vehicle is adjusted to illuminate the potential danger zone;
    wherein the distance from the potential danger zone is taken into account and the light control is adjusted with decreasing distance from the potential danger zone with the effect of bringing about a greater illumination of the potential danger zone.

2. The method as recited in claim 1, wherein the at least one traffic element that indicates a potential danger zone includes at least one of a crossing, an exit, a turn-off and an intersection.

3. The method as recited in claim 1, further comprising:
    determining an intention of a driver of the vehicle with respect to vehicle maneuver, wherein the control of the at least one illumination device is implemented only if the driver intention has been determined.

4. The method as recited in claim 3, wherein the driver intention includes one of a turn-off and a lane change, and wherein the driver intention is detected by an activation of a turn signal of the vehicle.

5. The method as recited in claim 2, wherein the crossing is detected on the basis of broad parallel lines in the recorded image.

6. The method as recited in claim 2, wherein the at least one of an exit, a turn-off and an intersection is detected if the recorded image shows a road marking including a solid line that splits into one solid line and one broken line.

7. A device for driver assistance in a vehicle, comprising:
    a camera configured to record an image of an area in front of the vehicle;
    an image analysis unit configured to analyze a traffic situation in front of the vehicle with the aid of the recorded image, wherein at least one traffic element that indicates a potential danger zones is determined by the analysis;
    a light control unit configured to control at least one illumination device of the vehicle in such a way that, upon determination of a potential danger zone, illumination of the area in front of the vehicle is adjusted to illuminate the potential danger zone;
    wherein the distance from the potential danger zone is taken into account and the light control is adjusted with decreasing distance from the potential danger zone with the effect of bringing about a greater illumination of the potential danger zone.

8. The device as recited in claim 7, wherein the at least one traffic element that indicates a potential danger zone includes at least one of a zebra crossing, an exit, a turn-off and an intersection.

9. The device as recited in claim 7, further comprising:
    a determining arrangement to determine an intention of a driver of the vehicle with respect to vehicle maneuver, wherein the control of the at least one illumination device is implemented only if the driver intention has been determined.

10. The device as recited in claim 9, wherein the driver intention includes one of a turn-off and a lane change, and wherein the driver intention is detected by an activation of a turn signal of the vehicle.

11. The device as recited in claim 8, wherein a zebra crossing is detected on the basis of broad parallel lines in the recorded image.

12. The device as recited in claim 8, wherein at least one of an exit, a turn-off and an intersection is detected if the recorded image shows a road marking including a solid line that splits into one solid line and one broken line.

13. The method as recited in claim 2,
    wherein at least one designated pedestrian crossing area is determined by the analysis, and
    wherein, upon the determination, at least one illumination device of the vehicle is controlled to add illumination to an area of at least one side of the designated pedestrian crossing area.

14. The method as recited in claim 1, further comprising:
    determining an intention of a driver of the vehicle with respect to vehicle maneuver, wherein the control of the at least one illumination device is implemented only if the driver intention has been determined;
    wherein the at least one traffic element that indicates a potential danger zone includes at least one of a crossing, an exit, a turn-off and an intersection,
    wherein the driver intention includes one of a turn-off and a lane change, and wherein the driver intention is detected by an activation of a turn signal of the vehicle,
    wherein the crossing is detected on the basis of broad parallel lines in the recorded image.

15. The method as recited in claim 14, wherein the at least one of an exit, a turn-off and an intersection is detected if the recorded image shows a road marking including a solid line that splits into one solid line and one broken line.

16. The method as recited in claim 15, wherein at least one designated pedestrian crossing area is determined by the analysis, and wherein, upon the determination, at least one illumination device of the vehicle is controlled to add illumination to an area of at least one side of the designated pedestrian crossing area.

17. The method as recited in claim 14, wherein at least one designated pedestrian crossing area is determined by the analysis, and wherein, upon the determination, at least one illumination device of the vehicle is controlled to add illumination to an area of at least one side of the designated pedestrian crossing area.

* * * * *